(12) United States Patent
Campos

(10) Patent No.: US 12,537,723 B1
(45) Date of Patent: Jan. 27, 2026

(54) RECURSIVE DOUBLING DECISION FEEDBACK EQUALIZER

(71) Applicant: Synopsys, Inc., Sunnyvale, CA (US)

(72) Inventor: Helder Filipe Santana Campos, Maia (PT)

(73) Assignee: SYNOPSYS, INC., Sunnyvale, CA (US)

( * ) Notice: Subject to any disclaimer, the term of this patent is extended or adjusted under 35 U.S.C. 154(b) by 0 days.

(21) Appl. No.: 18/884,413

(22) Filed: Sep. 13, 2024

(51) Int. Cl.
*H04L 25/03* (2006.01)
(52) U.S. Cl.
CPC .............................. *H04L 25/03057* (2013.01)
(58) Field of Classification Search
CPC ................................................ H04L 25/03057
See application file for complete search history.

(56) References Cited

U.S. PATENT DOCUMENTS 8,611,480 B1 * 12/2013 Lee ..................... H04L 1/0668
455/132
2022/0173943 A1 * 6/2022 Hormati ............ H04L 25/03057

OTHER PUBLICATIONS

Shiva Kiran et al., "A 52-Gb/s ADC-based PAM-4 receiver with comparator-assisted 2-bit/stage SAR ADC and partially unrolled DFE in 65-nm CMOS", IEEE Journal of Solid-State Circuits 54.3, Mar. 2019.
Keshab K. Parhi, "Design of Multigigabit Multiplexer-Loop-Based Decision Feedback Equalizers", IEEE Transactions on Very Large Scale Integration (VLSI) Systems, vol. 13, No. Apr. 4, 2005.
Peter M. Kogge et al., "A Parallel Algorithm for the Efficient Solution of a General Class of Recurrence Equations", IEEE transactions on computers, vol. C-22 No. Aug. 8, 1973.

* cited by examiner

*Primary Examiner* — Sung S Ahn
(74) *Attorney, Agent, or Firm* — Laxman Sahasrabuddhe; Park, Vaughan, Fleming & Dowler LLP

(57) ABSTRACT

A circuit may include a first circuit, a second circuit, and a third circuit. The first circuit may generate a first set of channel state vectors corresponding to a communication channel, where each channel state vector in the first set of channel state vectors includes a set of channel state indices, and where each channel state index corresponds to a sequence of decoded symbols received over the communication channel. The second circuit may combine a first channel state vector and a second channel state vector in the first set of channel state vectors to obtain a combined channel state vector. The third circuit may select a first channel state index in the combined channel state vector based on a second channel state index.

20 Claims, 11 Drawing Sheets

RECURSIVE DOUBLING DECISION FEEDBACK EQUALIZER

TECHNICAL FIELD

The present disclosure generally relates to an integrated circuit (IC). More specifically, the present disclosure relates to a recursive doubling decision feedback equalizer (DFE).

BACKGROUND

A transmitter may encode a set of symbols in a signal and send the signal to a receiver over a communication channel. The receiver may decode the set of symbols based on the received signal.

BRIEF DESCRIPTION OF THE FIGURES

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to a recursive doubling DFE. When a transmitter transmits a signal through a communication channel, the communication channel may corrupt the signal as the signal passes through the communication channel. For example, the communication channel may inject inter-symbol interference and/or additive white gaussian noise (AWGN) into the signal as the signal passes through the communication channel.

Figure 1:
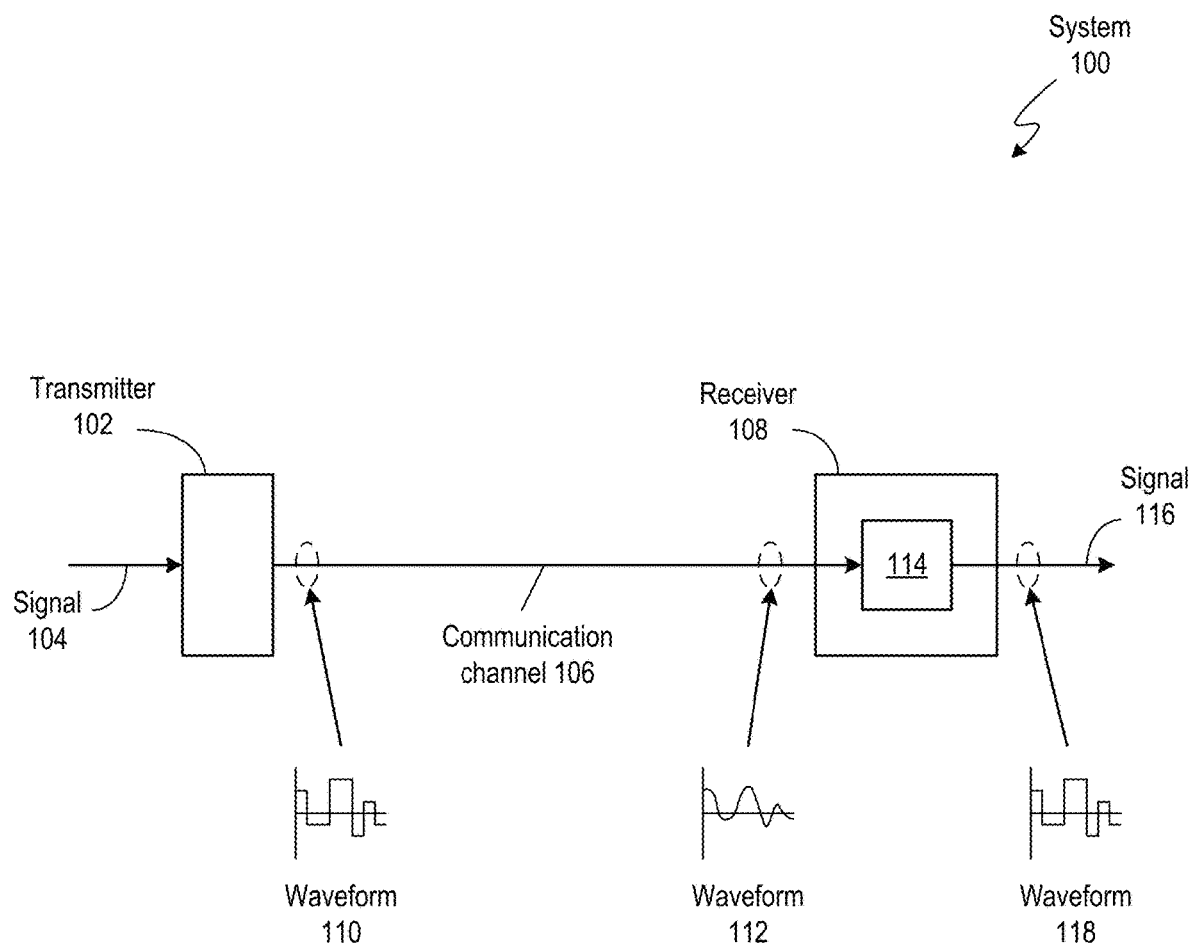
FIG. 1 illustrates a system which includes a transmitter and a receiver coupled using a communication channel in accordance with some embodiments described herein.

FIG. 1 illustrates a system which includes a transmitter and a receiver coupled using a communication channel in accordance with some embodiments described herein.

System 100 may include transmitter 102 which may transmit signal 104 through communication channel 106 which may be received by receiver 108. Waveform 110 of signal 104 when transmitter 102 transmits signal 104 may be different from waveform 112 of signal 104 when receiver 108 receives signal 104. Receiver 108 may include circuit 114 which may recover signal 116 based on signal 104 received by receiver 108. Waveform 118 of signal 116 may be substantially the same as waveform 110 of signal 104 (i.e., signal 104 as originally transmitted by transmitted 102). In this disclosure, the notation x[n] may represent the signal sampled by receiver 108 (i.e., corresponding to waveform 112), and the notation y[n] may represent signal 116 generated by circuit 114 (i.e., corresponding to waveform 118).

An example of circuit 114 includes, but is not limited to, a decision feedback equalizer (DFE), which may offer a compromise between performance and complexity. The throughput, bitrate, or speed at which transmitters and receivers are desired to be operated continues to increase dramatically. Some IC operating frequencies may severely limit the throughput of the DFE because the computations performed by a DFE circuit may take too long to complete at these operating frequencies. For example, the ratio between the desired throughput (which may correspond to the bitrate and/or speed at which transmitter and receivers are desired to be operated) and the clock frequency of a digital signal processor (DSP) (which may be used to perform the DFE computations) may be approximately 100. In other words, the clock frequency of a DSP may be 100 times less than the clock frequency which would enable the DSP to perform the DFE computations at the desired throughput.

Some approaches use parallelization to increase the throughput of DFE implementations. However, a significant gap remains between the throughput which is desired to be achieved and the throughput that is achievable using these parallelization approaches. Specifically, in these approaches, a delay of a critical path in the DFE implementation scales linearly (e.g., O(n)) with respect to the number of symbols (e.g., n) processed by the DFE in one computation cycle.

Embodiments described herein feature a DFE implementation which substantially increases the throughput. Specifically, some embodiments described herein use a recursive doubling circuit in the DFE implementation to substantially reduce the delay of the critical path in the DFE. The delay of the critical path in some embodiments described herein may scale logarithmically (e.g., $O(\log_2(n))$) with respect to the number of symbols (e.g., n) processed by the DFE in one computation cycle. In some embodiments described herein, the delay of the critical path in embodiments described herein may be constant (e.g., O(1)) with respect to the number of symbols (e.g., n) processed by the DFE in one computation cycle.

Technical advantages of embodiments described herein include, but are not limited to, (1) enabling a DFE implementation with a substantially higher throughput at a given operating frequency, (2) enabling a DFE implementation with a critical path which scales logarithmically with respect to the number of symbols processed in one computation cycle, and (3) enabling a DFE implementation with a critical path which is constant with respect to the number of symbols processed in one computation cycle.

The computations performed by a DFE may be recursively formulated as shown in Equation (1) below:

$$y[n] = Sl\left(x[n] - \sum_{i=1}^{v} c[i]y[n-i]\right),$$

where x[n] may be the input signal to the receiver (which may be a corrupted version of the original signal sent by the transmitter), y[n] may be the DFE output (which may also be referred to as decoded symbols), c[i] may be the communication channel coefficient i, v may be the number of channel taps, and Sl(x) may represent a slicing circuit which quantizes a signal to the nearest level selected from a set of m levels. In this disclosure, the term "channel tap" may refer to a delayed version of the input signal.

Figure 2A:
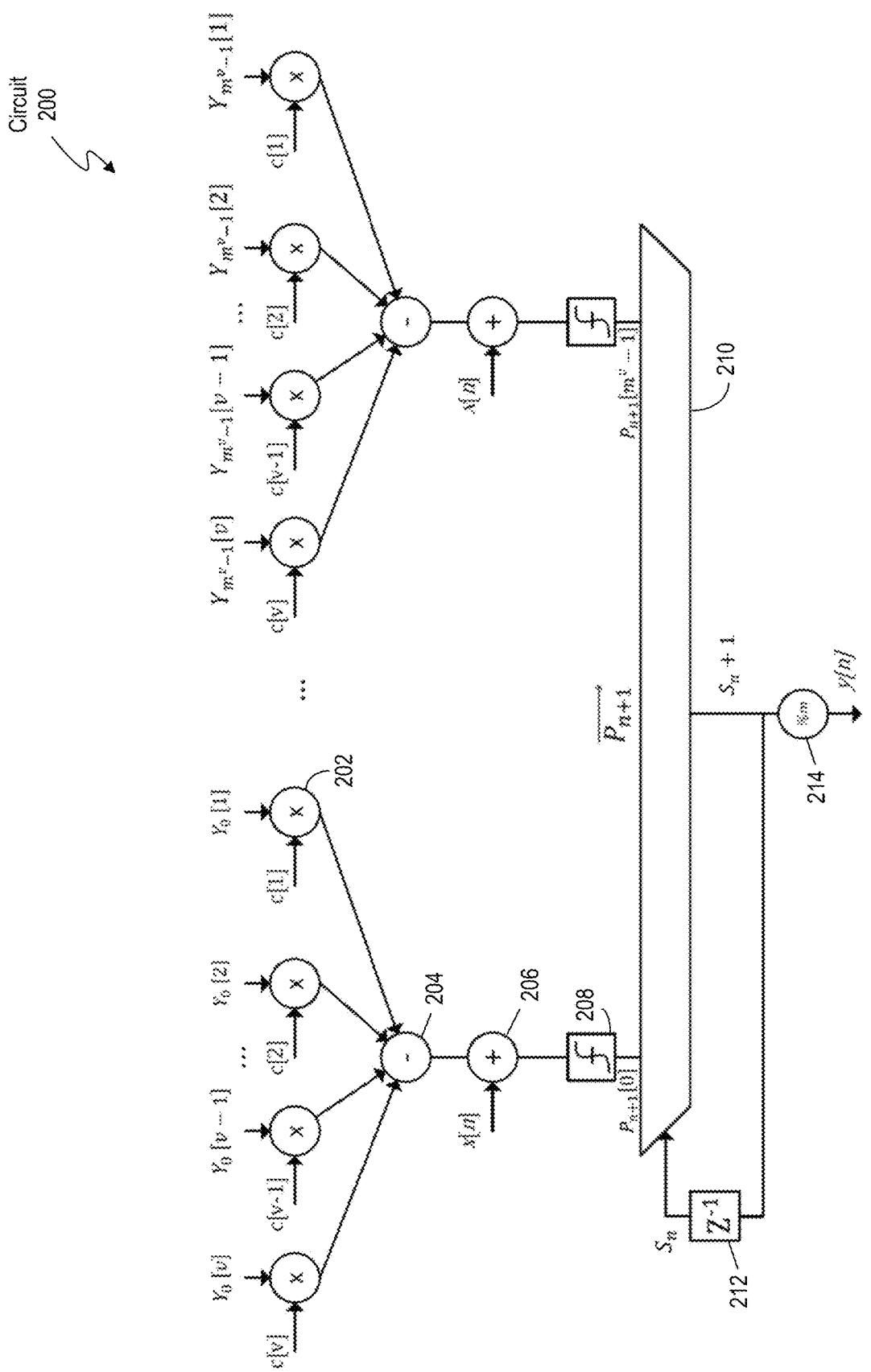
FIGS. 2A-2B illustrate a loop-unrolled DFE circuit in accordance with some embodiments described herein.
Figure 2B:
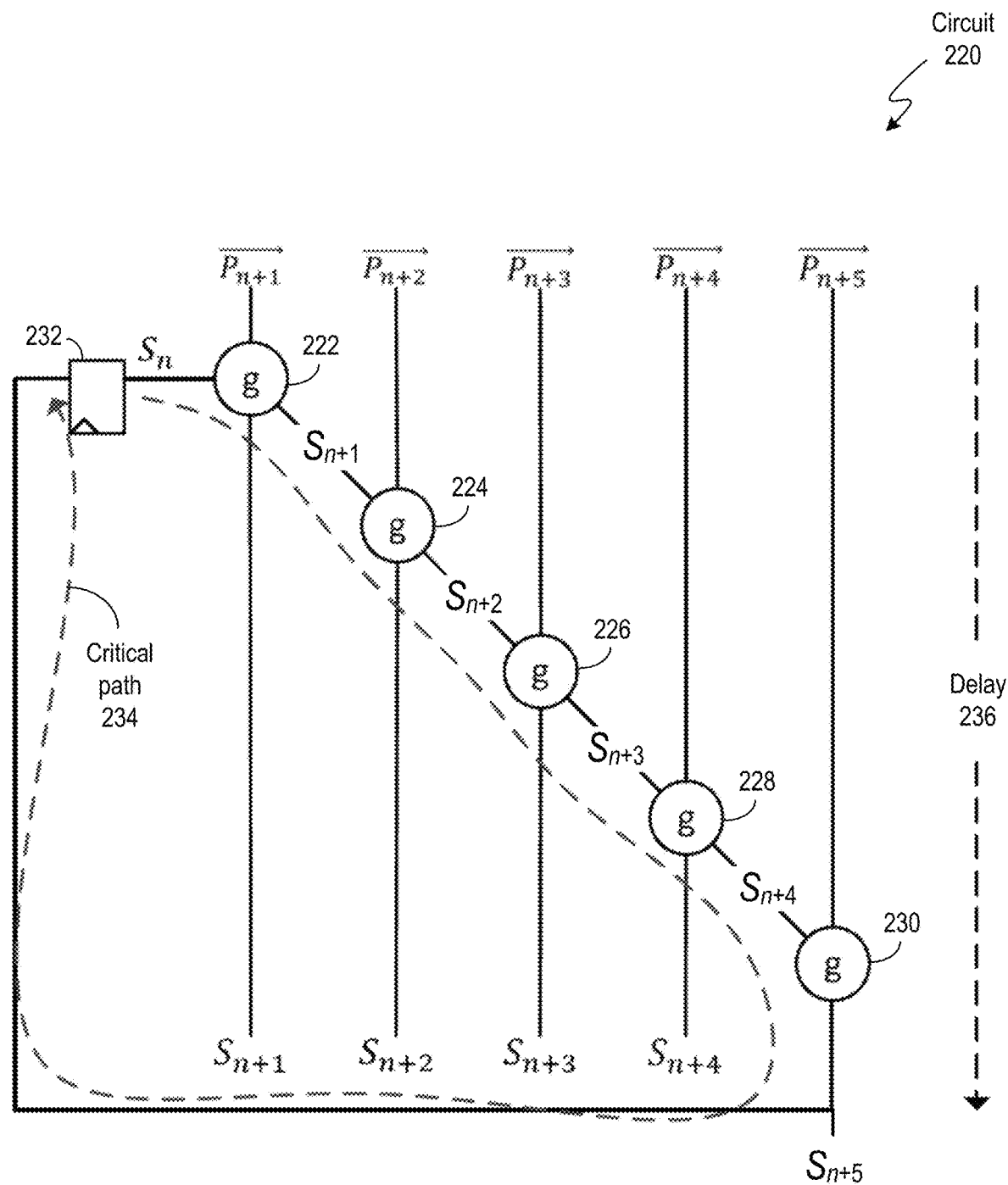

FIGS. 2A-2B illustrate a loop-unrolled DFE circuit in accordance with some embodiments described herein.

Some approaches parallelize the DFE computation shown in Equation (1) by using loop-unrolled circuit 200 shown in FIG. 2A. Circuit 200 may perform the channel convolution speculatively, breaking recursiveness for that part of the computation and allowing for a feed-forward pipeline. In this disclosure, the term "channel convolution" may refer to computing the sum in Equation (1), i.e., computing the value of $\Sigma_{i=1}^{v} c[i]y[n-i]$. In FIG. 2A, $Y_0[1]$ through $Y_0[v]$ are speculative past v values outputted by circuit 200. In this disclosure, the term "speculative" may refer to a value that is not known and is assumed for computation purposes. For example, the value of $Y_0[1]$ is only known after the value is decoded. However, circuit 200 assumes the value of $Y_0[1]$ for performing computations.

Circuit 202 may multiply the coefficients c[1] through c[v] with the respective $Y_0[1]$ through $Y_0[v]$ values, and circuit 204 may sum the products and invert the sign of the sum. Circuit 206 may add the output of circuit 204 with the current input sample x[n]. Slicer 208 may convert the output of circuit 206 into a discrete value $P_{n+1}[0]$ which may be provided as an input to multiplexer 210 (which is an $m^v$-to-1 multiplexer). The vector $\overrightarrow{P_{n+1}}$ may represent the set of $P_{n+1}[i]$ values, where $0 \leq i \leq m^v-1$.

The output ($S_n$) from multiplexer 210 in the previous computation cycle may be used as the select signal for multiplexer 210 in the current computation cycle. Specifically, delay 212 may be used to store the previous output ($S_n$) from multiplexer 210 and the output from delay 212 may be provided as the select signal to multiplexer 210. Multiplexer 210 may select an element from vector $\overrightarrow{P_{n+1}}$ (which may correspond to a particular input of multiplexer 210) based on the select signal $S_n$ and output the selected element from vector $\overrightarrow{P_{n+1}}$ as the output $S_{n+1}$ (which may be used as the select signal for the next computation cycle). Circuit 214 may decode signal $S_{n+1}$ to obtain a corresponding symbol y[n]. In circuit 200, multiplexer 210 may represent a recursive computation because computing the output $S_{n+1}$ depends on the value of the previous output $S_n$.

Multiple output symbols may be desired to be produced in one computation cycle. In other words, multiple x[n] values (e.g., x[n], ..., x[n+4]) may be provided to a DFE circuit, and the corresponding $S_n$ (e.g., $S_{n+1}, \ldots, S_{n+5}$) values may be desired to be generated in one computation cycle. FIG. 2B illustrates circuit 220 which may recursively generate the $S_{n+1}, \ldots, S_{n+5}$ (or y[n], ..., y[n+4]) values in one computation cycle. Multiplexers 222, 224, 226, 228, and 230 may be coupled in a chain as shown in FIG. 2B. In this disclosure, an $m^v$-to-1 multiplexer (e.g., multiplexer 210) may be represented with the letter "g." Each multiplexer receives a respective $\overrightarrow{P}$ vector as the input and the output of the previous multiplexer as the select signal. Each $\overrightarrow{P}$ vector may be computed based on the corresponding x value. For example, multiplexer 224 receives vector $\overrightarrow{P_{n+2}}$ (which may be computed based on x[n+1] using the circuitry shown in FIG. 2A) as the input and the output of multiplexer 222 (i.e., $S_{n+1}$) as the select signal. Circuit 220 may generate outputs $S_{n+1}$ through $S_{n+5}$ in one computation cycle if delay 236 of critical path 234 is less than the time allowed to perform one computation cycle. Delay element 232 stores the value of the latest output (e.g., $S_{n+5}$) which may be used as the select input for multiplexer 222 in the next computation cycle (which may compute $S_{n+6}, \ldots, S_{n+10}$).

In FIG. 2B, delay 236 scales with the number of symbols that are desired to be generated or decoded in one computation cycle. In other words, delay 236 scales as O(N) with respect to the N symbols that are desired to be generated in one computation cycle. The delay of the recursion path (e.g., delay 236) may be approximately equal to $NT_{mux}$, where $T_{mux}$ is the delay of a single multiplexer and N is the number of symbols that are desired to be generated in one computation cycle. If the clock frequency is f, then the time within which the computation cycle must complete is $T_{max}$. Thus, the maximum value for N may be $$\frac{T_{max}}{T_{mux}}$$

the maximum link throughput may be approximately $$\frac{1}{T_{mux}}.$$

he throughputs at which receivers are desired to be operated may be greater than the maximum link throughput which may be achievable using circuit 220.

Some embodiments described herein use a recursive doubling circuit to reduce the delay of the critical path in a loop unrolled DFE so that the delay of the critical path is proportional to $\log_2 N$ (instead of N). To illustrate the reduction in the delay using a concrete example, consider a case where N=80 (i.e., 80 symbols are desired to be decoded in one computation cycle), and the communication system uses quaternary signaling (i.e., m=4). An implementation which does not use embodiments described herein may have a critical path delay of 10 units (e.g., 10 clock cycles). An implementation which uses embodiments described herein may have a critical path delay of less than 2 units (e.g., 2 clock cycles).

The previous v symbols sent over the communication channel may represent the channel state. The number of possible channel states is finite because each of the previous v symbols are drawn from a finite set of m symbols. In FIG. 2A, each set of $Y_i[1]$ through $Y_i[v]$ values may represent a possible channel state. Circuit 200 may compute the next symbol by computing the outputs for every possible channel state, where the possible outputs are represented by the P vector in FIG. 2A. Multiplexer 210 selects the correct output depending on the actual channel state. The computations illustrated in FIG. 2A may be formally represented by the following equations.

Equation (2) shown below maps each set of Y values to an index, where each set of Y values corresponds to a specific sequence of v previous values, and where each sequence of v previous values corresponds to a channel state (which is speculatively computed):

$$\text{index}(Y_i) = i = \sum_{j=1}^{v} Y_i[j] \times m^{j-1}.$$

In other words, Equation (2) maps each channel state to an index value by treating each symbol in the channel state as a radix m digit in a v digit number. Vector $\overrightarrow{P_{n+1}}$ may denote all possible channel state indexes speculatively defined at time n+1 (i.e., computation cycle n+1). In other words, vector $\overrightarrow{P_{n+1}}$ may represent the channel state given any possible previous state in Y, as shown in Equation (3) below:

$$\overrightarrow{P_{n+1}} = \begin{bmatrix} \text{index}\left(\left[Sl\left(x[n] - \sum_{i=1}^{v} c[i]Y_0[i]\right) \; Y_0[1] \; \ldots \; Y_0[v-1]\right]\right) \\ \ldots \\ \text{index}\left(\left[Sl\left(x[n] - \sum_{i=1}^{v} c[i]Y_{m^v-1}[i]\right) \; Y_{m^v-1}[1] \; \ldots \; Y_{m^v-1}[v-1]\right]\right) \end{bmatrix}.$$

Equation (4) shown below formally represents selecting $S_{n+1}$ based on the vector $\overrightarrow{P_{n+1}}$ and the previous output $S_n$ from the multiplexer 210:

$$S_{n+1} = \overrightarrow{P_{n+1}}[S_n].$$

Equation (5) shown below formally represents decoding the symbol y[n] based on the output $S_{n+1}$ of the multiplexer 210 (i.e., output y[n] may be the first symbol of the sequence generating the state index $S_{n+1}$):

$$y[n] = S_{n+1} \bmod m.$$

Some embodiments described herein may increase the throughput of the DFE without increasing the clock frequency by parallelizing the computation illustrated by Equation (4). Specifically, embodiments described herein may feature multiple ways of parallelizing a DFE using recursive doubling. A first embodiment may enable N DFE outputs to be produced in parallel, with critical timing scaling proportionally to $\log_2(N+1)$ while trying to minimize area. The first embodiment may include nodes which have a large fanout. In this disclosure, the term "node" may refer to a circuit (e.g., a multiplexer). A second embodiment may ensure that the fanout of nodes is fixed but may have a greater area than the first embodiment. A third embodiment may enable full pipelining of the multiplexing stages and reduce the critical path to a single mu-to-1 multiplexer. In some embodiments, pipeline registers may be used to ensure the computations have a fixed latency independently of clock frequency.

In the recursive Equation (4), the next DFE state $S_{n+1}$ depends on the previous state $S_n$. In this disclosure, the symbol or function g may represent a multiplexer (e.g., multiplexer 210) which receives two inputs: a $\overrightarrow{P}$ vector (e.g., the inputs of multiplexer 210), and a state S (e.g., signal $S_n$ which is provided as a select input to multiplexer 210). Function g may perform the functionality of a multiplexer, e.g., function g may select an element in the $\overrightarrow{P}$ vector based on the previous state S. Computing state or signal $S_{n+3}$ may be represented by Equation (6) shown below:

$$S_{n+3} = g\left(g\left(g\left(S_n, \overrightarrow{P_{n+1}}\right), \overrightarrow{P_{n+2}}\right), \overrightarrow{P_{n+3}}\right).$$

It is noted that function g is semi-associative. A function h (which corresponds to function g) may be determined which associates to the right argument, i.e., $g\;(g\;(s, \overrightarrow{t}), \overrightarrow{u}) = g\;(s, h(\overrightarrow{t}, \overrightarrow{u}))$. The function $h(\overrightarrow{t}, \overrightarrow{u})$ may represent a speculative multiplexer which applies a vector t (which represents all possible values of t) as a possible selection index of u and returns a vector with all possible outputs. In other words, the function $h(\overrightarrow{t}, \overrightarrow{u})$ may be defined as shown in Equation (7) below:

$$h(\overrightarrow{t}, \overrightarrow{u}) = \begin{bmatrix} g(t[0], \overrightarrow{u}) \\ \ldots \\ g(t[m^v - 1], \overrightarrow{u}) \end{bmatrix},$$

where t[0] through t[$m^v-1$] represent all possible values of an input t, u represents a vector input, and $g(t[i], \overrightarrow{u})$ represents the output generated by function g for the inputs t[i] and $\overrightarrow{u}$. Thus, function $h(\overrightarrow{t}, \overrightarrow{u})$ returns a combined vector which combines the input vectors $\overrightarrow{t}$ and $\overrightarrow{u}$, where each element in the combined vector corresponds to the value generated by function g for a respective input value t[i] (which is provided as the select signal to function g).

The DFE computation may be represented by the following set of equations (which is referred to as Set of Equations (8)):

$$S_{n+1} = g(S_n, Q(1, 1))$$
$$S_{n+3} = g(S_{n+1}, Q(2, 3))$$
$$S_{n+7} = g(S_{n+3}, Q(4, 7))$$
$$\ldots$$

where, the Q values are defined by Equation (9) shown below:

$$Q(a, b) = h\left(\overrightarrow{P_{n+a}}, h\left(\overrightarrow{P_{n+a+1}}, h\left(\overrightarrow{P_{n+a+2}}, \ldots \overrightarrow{P_{n+b}}\right)\right)\right).$$

In general, for $k=2^j$, $j \in \mathbb{N}$, the recursive doubling circuit may be represented by the Equation (10) shown below:

$$S_{n+2k-1} = g\;(S_{n+k-1}, Q(k, 2k-1)).$$

Specifically, Equation (9) may be used to compute an arbitrary number of iterations of Equation (4) using a recursive doubling circuit. Each level in the recursive doubling circuit may use twice the amount of parallel processing units with respect to the previous level.

Figure 3:
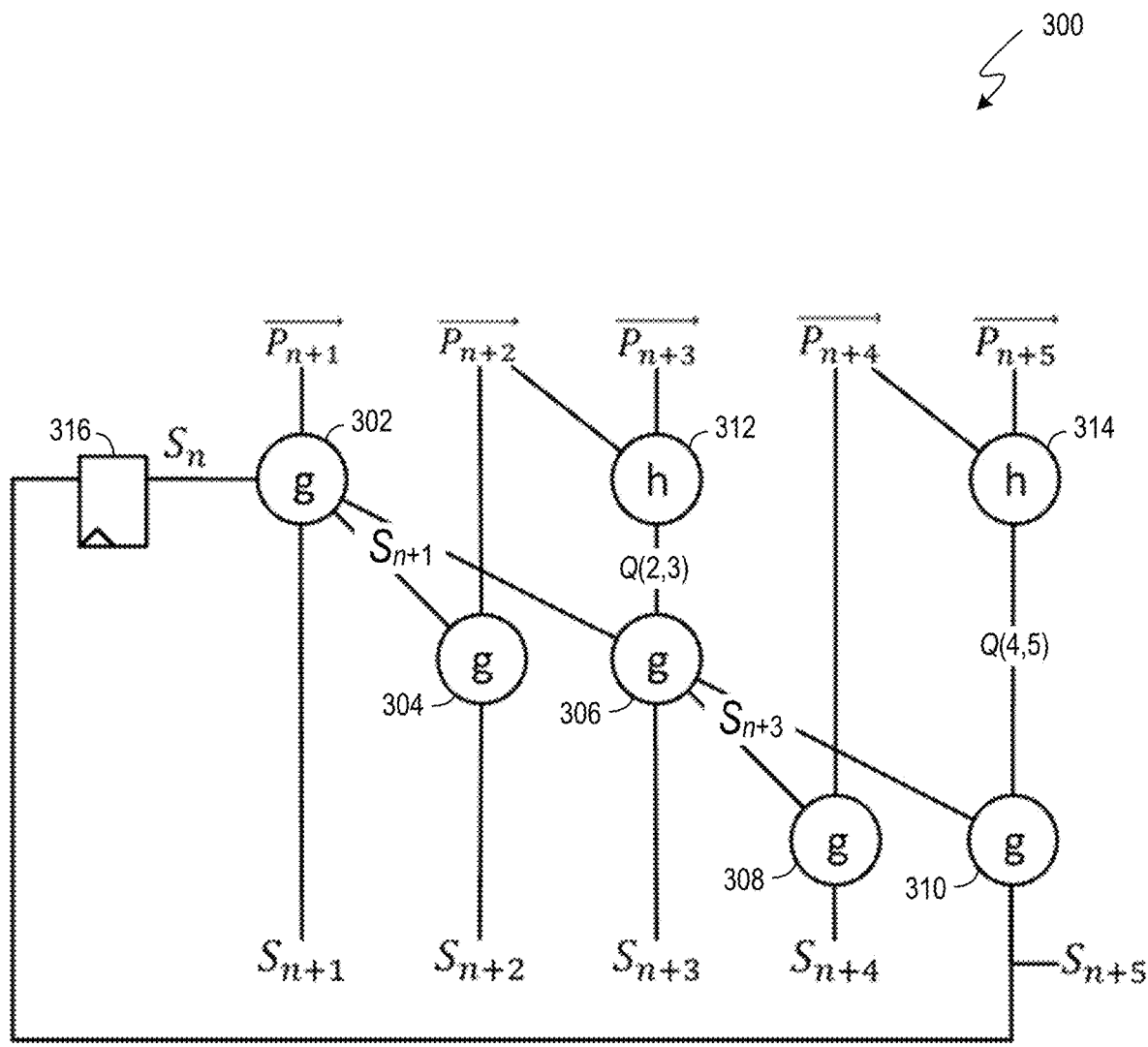
FIG. 3 illustrates a DFE circuit based on recursive doubling in accordance with some embodiments described herein.

FIG. 3 illustrates a DFE circuit based on recursive doubling in accordance with some embodiments described herein.

In circuit 300, vectors $\overrightarrow{P_{n+1}}$ through $\overrightarrow{P_{n+5}}$ may be generated as explained in reference to FIGS. 2A-2B. The circuitry represented by the letter g may represent a multiplexer which selects a particular element of the $\vec{P}$ vector based on signal S which is the previous output of a multiplexer, and which is provided as the select input to the multiplexer. For example, multiplexer 302 may receive vector $\overrightarrow{P_{n+1}}$ as the input and the signal $S_n$ as the select input. Multiplexer 302 may select an element from vector $\overrightarrow{P_{n+1}}$ (e.g., the element in $\overrightarrow{P_{n+1}}$ which corresponds to signal $S_n$) as the output, which is shown as $S_{n+1}$. The output $S_{n+1}$ is provided as a select input to multiplexers 304 and 306. The output of multiplexer 306 is $S_{n+3}$ and is provided as the select input to multiplexers 308 and 310. Delay 316 may store the last output $S_{n+5}$ so that $S_{n+5}$ may be provided as the select signal to multiplexer 302 in the next computation cycle.

Circuit 300 also includes circuitry represented by the letter h, and which implements the functionality represented by Equation (7). For example, speculative multiplexer 312 may implement the functionality of Equation (7), where t is $\overrightarrow{P_{n+2}}$, and $\vec{u}$ is $\overrightarrow{P_{n+3}}$. The output of speculative multiplexer 312 may be equal to Q(2,3) as defined in Equation (9). Similarly, speculative multiplexer 314 may implement the functionality of Equation (7), where $\vec{t}$ is $\overrightarrow{P_{n+4}}$, and $\vec{u}$ is $\overrightarrow{P_{n+5}}$, and the output of speculative multiplexer 314 may be equal to Q(4,5) as defined in Equation (9).

Some embodiments described herein may create a DFE circuit (e.g., circuit 300) based on recursive doubling by defining vectors $A_i^k$ and scalar $B_i^k$ for each stage $k \in [0; \lceil \log_2(i+1) \rceil]$ and output i as follows:

a. $A_i^0 = [Q(1, 1) \ldots Q(i, i)]$ b. $B_i^0 = S_n$ c. $A_i^k = \begin{cases} E1 & \text{if } len(A_i^{k-1}) = 2 \\ E2 & \text{if } len(A_i^{k-1}) = 3 \\ E3 & \text{if } len(A_i^{k-1}) \bmod 2 = 0 \\ E4 & \text{if } len(A_i^{k-1}) \bmod 2 = 1 \end{cases}$ d. $B_i^k = g(B_i^{k-1}, A_i^{k-1}[0])$ e. $S_{n+i} = B_i^{\lceil \log_2(i+1) \rceil}$ where, the expressions E1 through E4 in item (c) shown above may be defined as follows:

$E1 = A_i^{k-1}[1],$ $E2 = h(A_i^{k-1}[1], A_i^{k-1}[2]),$ $E3 = [h(A_i^{k-1}[1], A_i^{k-1}[2]) \ldots A_i^{k-1}[len(A_i^{k-1}) - 1]],$ and $E4 = [h(A_i^{k-1}[1], A_i^{k-1}[2]) \ldots h(A_i^{k-1}[len(A_i^{k-1}) - 2], A_i^{k-1}[len(A_i^{k-1}) - 1])].$ Circuitry corresponding to common $A_i^k$ and $B_i^k$ terms may be merged, i.e., multiple instances of $A_i^k$ (or $B_i^k$) circuits may be replaced with a single instance of an $A_i^k$ (or $B_i^k$) circuit with a larger fanout. In other words, computation nodes (e.g., $A_i^k$ or $B_i^k$) may be re-used as much as possible. Outputs from a previous stage in the circuit may be combined, pair by pair, from left to right (or from lower index to higher index) on a subsequent stage. Combining the outputs may ensure that different output indexes (i) share most of the computation done for lower output indexes, since higher output indexes share the data from lower output indexes. It is noted that the critical path delay in circuit 300 is proportional to $\lceil \log_2(N+1) \rceil$. Specifically, the critical path delay in circuit 220 in FIG. 2B passes through five multiplexers (e.g., the g nodes in FIG. 2B), whereas the critical path delay in circuit 300 passes through three multiplexers (e.g., multiplexers 302, 306, and 310). Thus, the throughput of circuit 300 is substantially greater than the throughput of circuit 220. It is noted that the area of circuit 300 (which includes five g nodes and two h nodes) may be greater than the area of circuit 220 (which includes five g nodes). At higher N values, the fanout for certain g nodes may be large. For example, for N=15, a g node in the circuit may have a fanout of eight. In such circuits, buffers may be added to the fanout network to help the critical path delay meet timing requirements.

Figure 4:
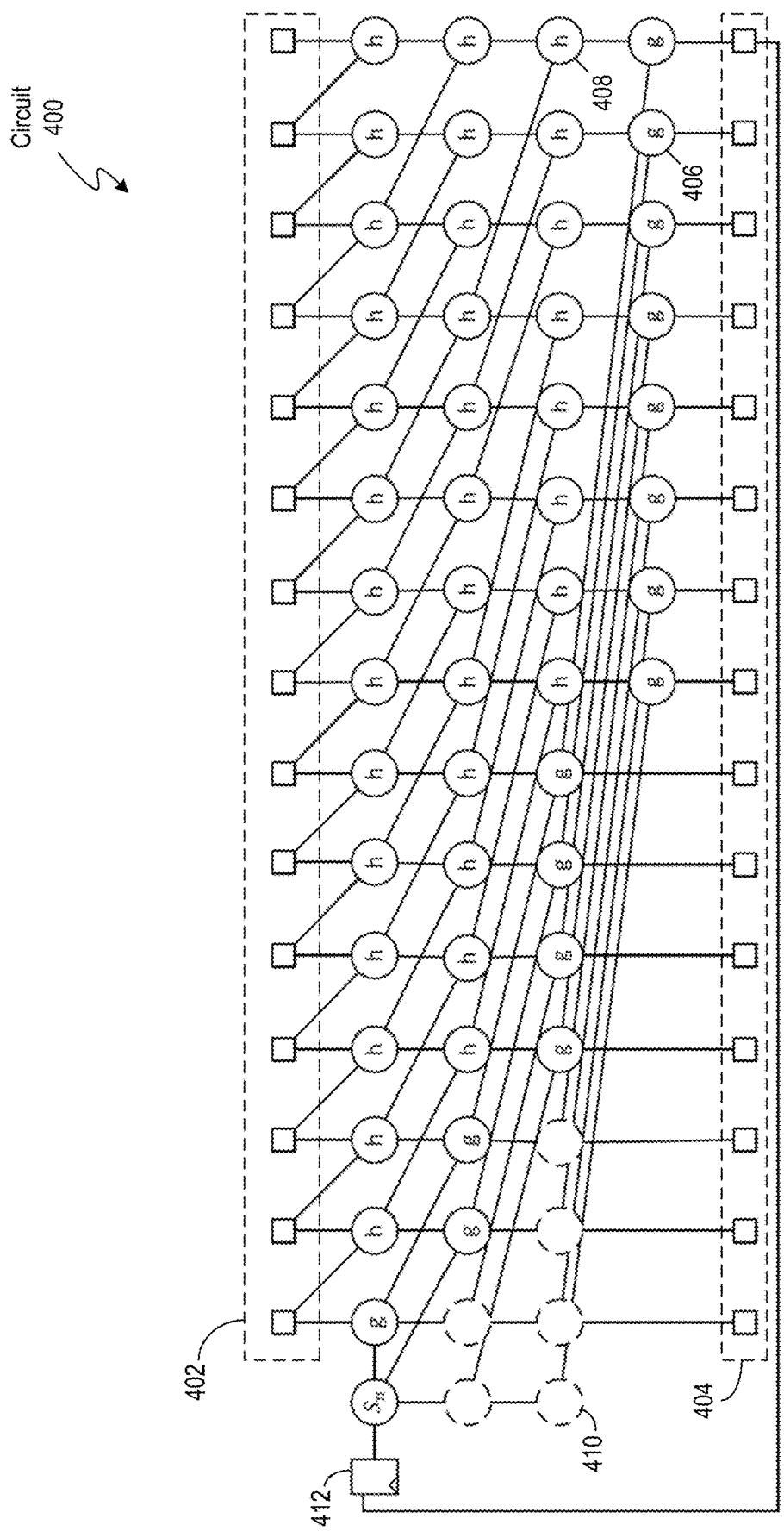
FIG. 4 illustrates a DFE circuit based on recursive doubling which avoids large fanouts in accordance with some embodiments described herein.

FIG. 4 illustrates a DFE circuit based on recursive doubling which avoids large fanouts in accordance with some embodiments described herein.

Circuit 400 may avoid large fanouts by including multiple instances of a circuit which would have otherwise been connected to a large fanout network. Some embodiments described herein may create a DFE circuit (e.g., circuit 400) based on defining scalars $A_i^k$ and $B_i^k$ for each stage $k \in [0; \lceil \log_2(i+1) \rceil]$ and output $i \in [1; N]$ as follows:

a. $A_i^0 = Q(i, i)$ b. $B_i^0 = S_n$ c. $A_i^k = \begin{cases} h(A_{i-2^{k-1}}^{k-1}, A_i^{k-1}), & \text{if } (i - 2^{k-1}) \geq 0 \\ \text{buffer}(A_i^{k-1}), & \text{if } (i - 2^{k-1}) < 0 \end{cases}$ d. $B_i^k = \begin{cases} g(B_{i-2^{k-1}}^{k-1}, A_i^{k-1}), & \text{if } (i - 2^{k-1}) \geq 0 \\ [(\text{buffer}(B))_i^{k-1}], & \text{if } (i - 2^{k-1}) < 0 \end{cases}$ e. $S_{n+i} = B_i^{\lceil \log_2(i+1) \rceil}$ In FIG. 4, N=15, i.e., circuit 400 may generate 15 symbols in one computation cycle. Inputs 402 may correspond to the P vectors, outputs 404 may correspond to the multiplexer outputs S which may then be decoded to obtain symbols y. Circuit 400 may include g nodes (e.g., g node 406), h nodes (e.g., h node 408), and optional buffers (e.g., buffer 410 in dotted circle) connected as shown in FIG. 4. Delay 412 may be used to store the last state and provide the stored state as a select signal in the next computation cycle. It is noted that circuit 400 may have a larger area than a corresponding circuit which uses larger fanouts but fewer g and h nodes.

Figure 5:
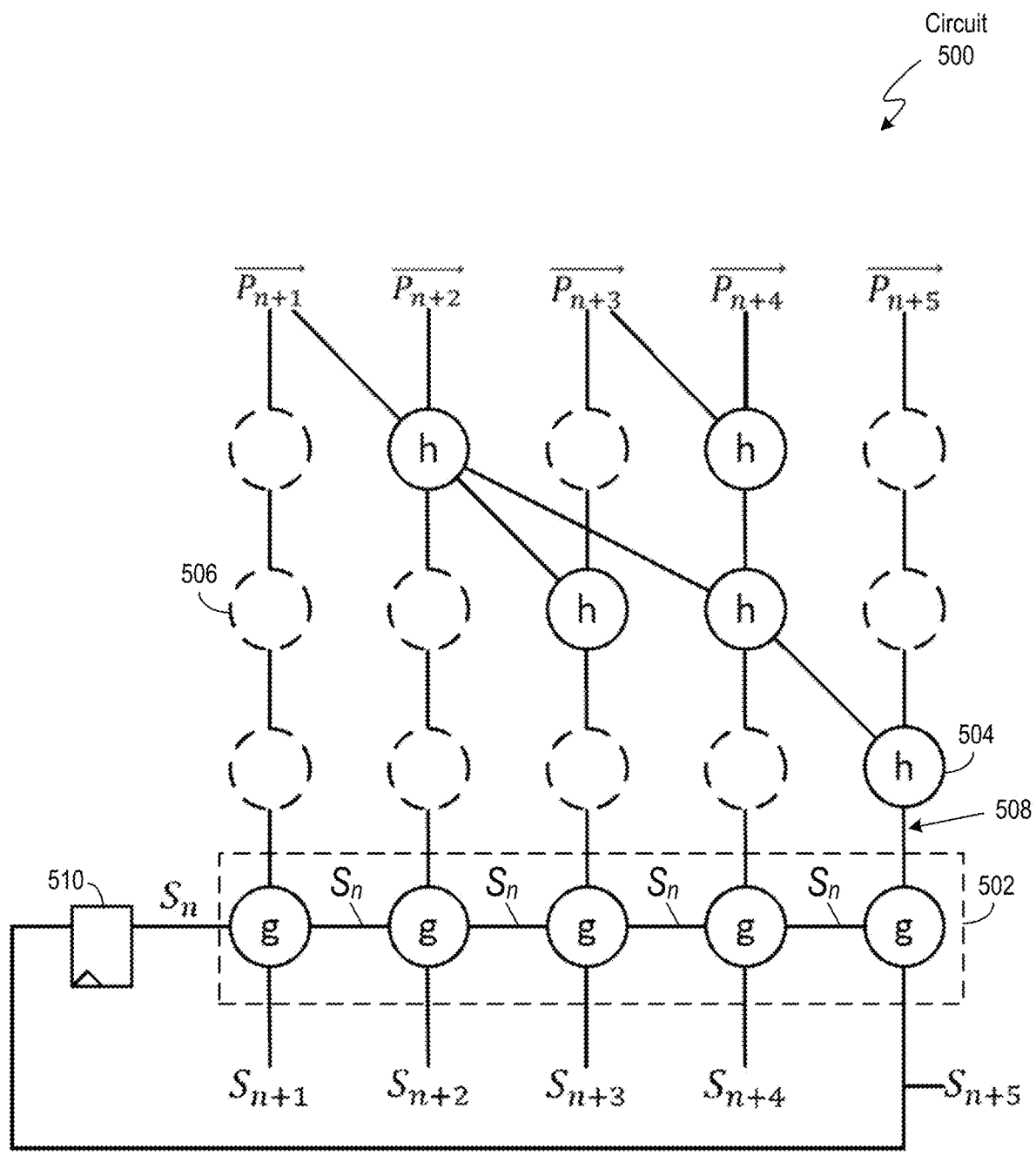
FIG. 5 illustrates another DFE circuit based on recursive doubling in accordance with some embodiments described herein.

FIG. 5 illustrates another DFE circuit based on recursive doubling in accordance with some embodiments described herein.

Circuit 500 may recursively combine the look-ahead symbols first and apply a single recursive step at the end, which may enable circuit 500 to scale up to an unlimited throughput if a single $m^v$-to-1 multiplexer meets the timing constraints and if the power and area budgets are sufficiently large to implement the DFE circuitry.

Some embodiments described herein may create a circuit (e.g., circuit 500) based on defining vectors $A_i^k$ for each stage $k \in [0; \lceil \log_2(i) \rceil]$ as follows:

a. $A_i^0 = [Q(1, 1) \ldots Q(i, i)]$ b. $A_i^k = \begin{cases} E1, & \text{if } len(A_i^{k-1}) \bmod 2 = 0 \\ E2, & \text{if } len(A_i^{k-1}) \bmod 2 \neq 0 \end{cases}$ c. $S_{n+i} = g\left(S_n, A_i^{\lceil \log_2 i \rceil}\right)$ where expressions E1 and E2 in item (b) above may be defined as follows:

$E1 =$
$\left[h(A_i^{k-1}[0], A_i^{k-1}[1]) \ldots h(A_i^{k-1}[len(A_i^{k-1}) - 2], A_i^{k-1}[len(A_i^{k-1}) - 1])\right]$ and
$E2 = \left[h(A_i^{k-1}[0], A_i^{k-1}[1]) \; h(A_i^{k-1}[2], A_i^{k-1}[3]) \ldots A_i^{k-1}[len(A_i^{k-1}) - 1]\right],$ and where, common $A_i^k$ circuits may be merged, i.e., multiple instances of $A_i^k$ circuits may be replaced with a single instance of an $A_i^k$ circuit with a larger fanout.

Circuit 500 may include g nodes (e.g., g nodes 502), h nodes (e.g., h node 504), and optional buffers (e.g., buffer 506) connected as shown in FIG. 5 in accordance with items (a)-(c) shown above. It is noted that each of the g nodes 502 (where each g node may implement a multiplexer) receives $S_n$ as the select input. The inputs to each of the multiplexers implemented by g nodes 502 (e.g., input 508) provide the result of speculatively and recursively combining the look-ahead symbols. When the g nodes 502 are provided the select input $S_n$, the g nodes 502 generate outputs $S_{n+1}$ through $S_{n+5}$ in a single computation cycle. Thus, the critical path delay in circuit 500 includes a single g node. Delay 510 may be used to store the last output (e.g., $S_{n+5}$) so that the last output can be used as the select signal in the next computation cycle.

Figure 6:
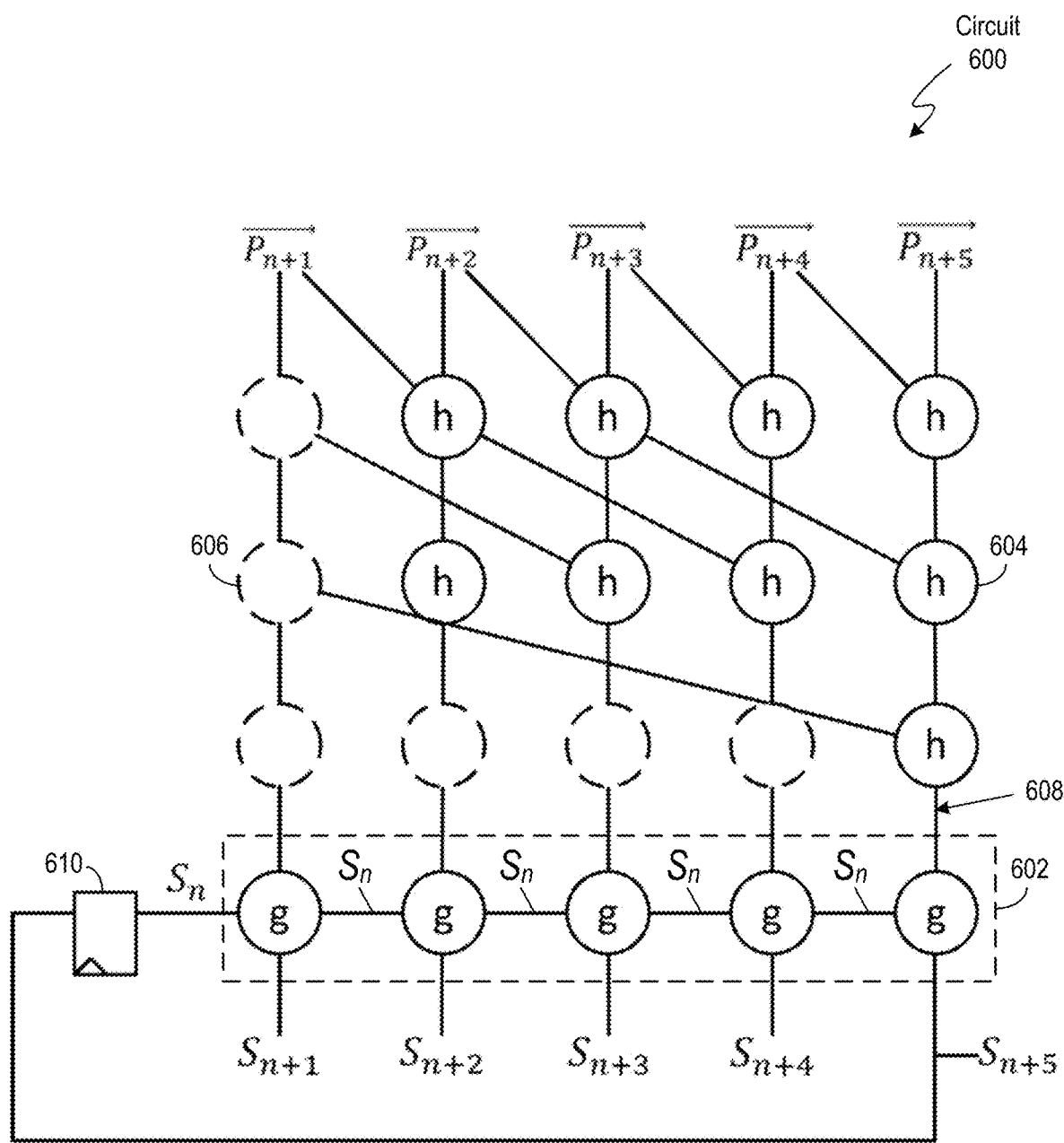
FIG. 6 illustrates another DFE circuit based on recursive doubling in accordance with some embodiments described herein.

FIG. 6 illustrates another DFE circuit based on recursive doubling in accordance with some embodiments described herein.

Circuit 600 may recursively combine the look-ahead symbols first and apply a single recursive step at the end, which may enable circuit 600 to scale up to an unlimited throughput if a single $m^v$-to-1 multiplexer meets the timing constraints and if circuit 600 is within the power and area budgets. Additionally, circuit 600 may ensure that each h node has the same fanout.

Some embodiments described herein may create a circuit (e.g., circuit 600) based on defining scalars $A_i^k$ for each stage $k \in [1; \lceil \log_2(N) \rceil]$ as follows:

a. $A_i^0 = Q(i, i)$ b. $A_i^k = \begin{cases} h(A_{i-2^{k-1}}^{k-1}, A_i^{k-1}), & \text{if } (i - 2^{k-1}) \geq 0 \\ \text{buffer}(A_i^{k-1}), & \text{if } (i - 2^{k-1}) < 0 \end{cases}$ c. $S_{n+i} = g\left(S_n, A_i^{\lceil \log_2 i \rceil}\right)$ Circuit 600 may enable pipelining for all multiplexing stages, which may allow the critical path delay to be equal to the delay of one g node. Specifically, circuit 600 may combine all possible sequences up-front (e.g., $A_i^k$ values) without incorporating the previous cycle decision. Circuit 600 may include g nodes (e.g., g nodes 602), h nodes (e.g., h node 604), and optional buffers (e.g., buffer 606) connected as shown in FIG. 6 in accordance with items (a)-(c) shown above. It is noted that each of the g nodes 602 (where each g node may implement a multiplexer) receives $S_n$ as the select input. The inputs to each of the g nodes 602 (e.g., input 608) may provide the result of speculatively and recursively combining the look-ahead symbols. When the g nodes 602 (where each g node may implement a multiplexer) are provided the select input $S_n$, the g nodes 602 may generate outputs $S_{n+1}$ through $S_{n+5}$ in a single computation cycle (where each g node may implement a multiplexer and may select one of the inputs as the output based on the select signal). Thus, the critical path delay in circuit 600 includes a single g node. Delay 610 may be used to store the last output (e.g., $S_{n+5}$) so that the last output (e.g., $S_{n+5}$) can be used as the select signal in the next computation cycle.

Figure 7A:
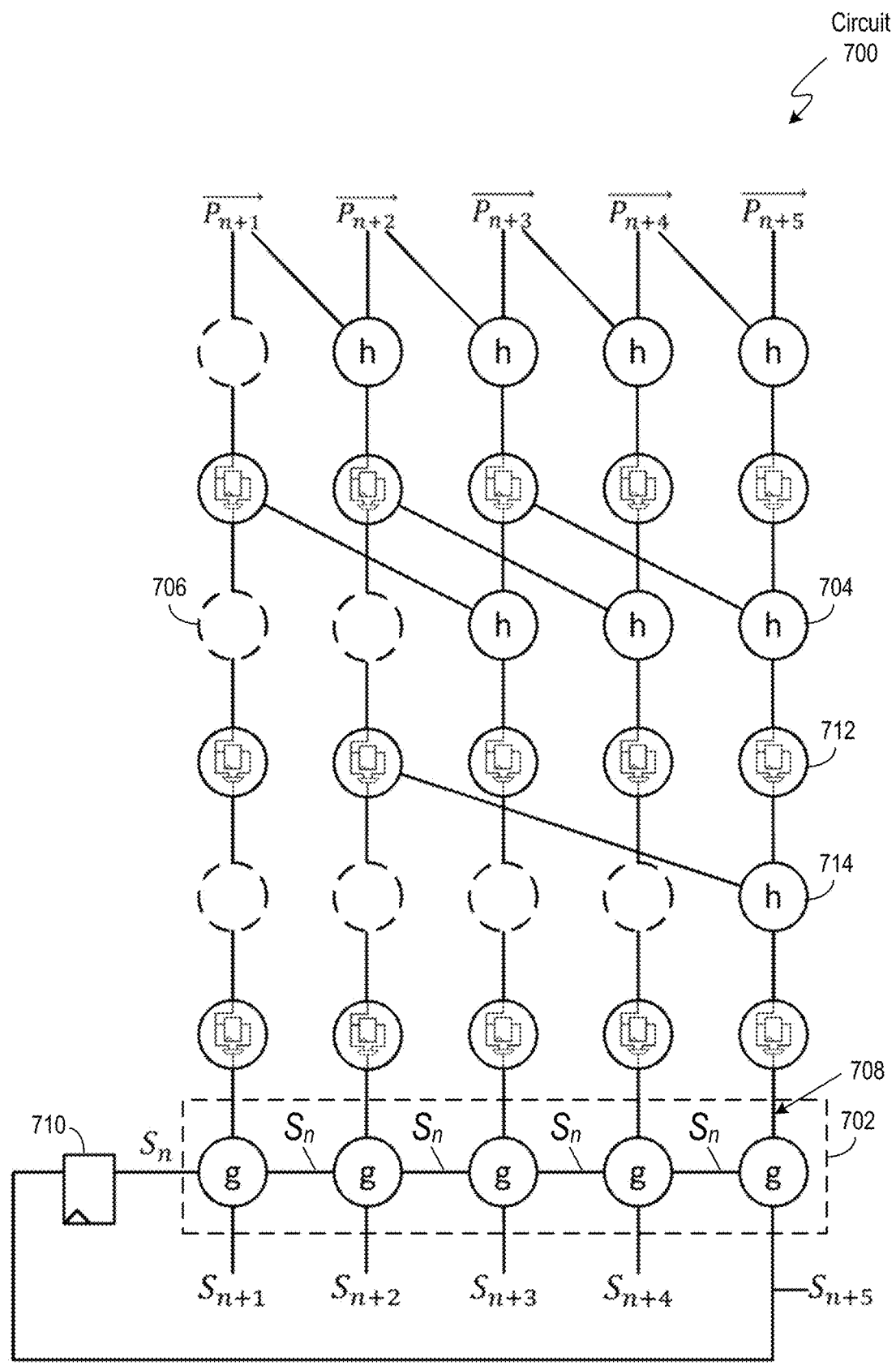
FIGS. 7A-7B illustrate a DFE circuit based on recursive doubling and which includes pipeline registers in accordance with some embodiments described herein.
Figure 7B:
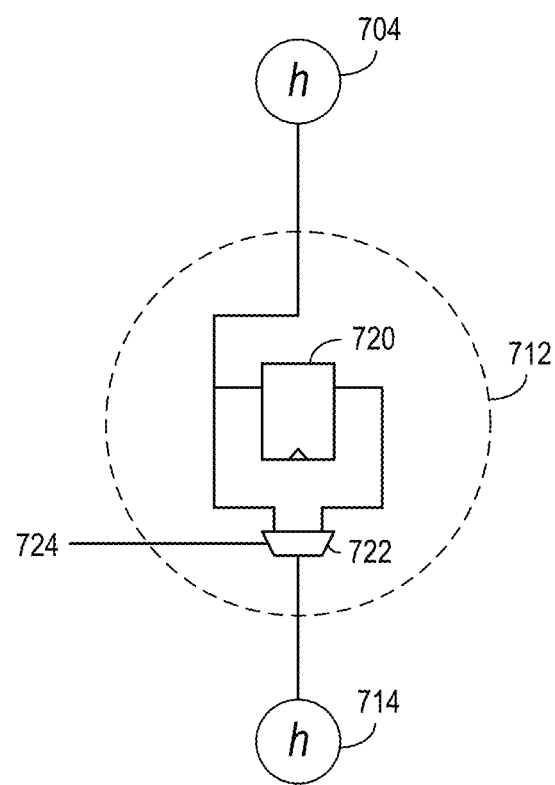

FIGS. 7A-7B illustrate a DFE circuit based on recursive doubling and which includes pipeline registers in accordance with some embodiments described herein.

In FIG. 7A, circuit 700 may recursively combine the look-ahead symbols first and apply a single recursive step at the end, which may enable circuit 700 to scale up to an unlimited throughput if a single $m^v$-to-1 multiplexer meets the timing constraints and if circuit 700 is within the power and area budgets. Additionally, circuit 700 may ensure that each h node has the same fanout and include pipeline registers to store intermediate values when recursively combining the look-ahead symbols.

Circuit 700 may be created based on defining scalars $A_i^k$ for each stage $k \in [1; \lceil \log_2(N) \rceil]$ as follows:

a. $A_i^0 = Q(i, i)$ b. $A_i^k = \begin{cases} h(A_{i-2^{k-1}}^{k-1}, A_i^{k-1}), & \text{if } (i - 2^{k-1}) \geq 0 \\ \text{buffer}(A_i^{k-1}), & \text{if } (i - 2^{k-1}) < 0 \end{cases}$ c. $S_{n+i} = g\left(S_n, A_i^{\lceil \log_2 i \rceil}\right)$ Circuit 700 may enable pipelining for all multiplexing stages. Specifically, circuit 700 may combine all possible sequences up-front (e.g., $A_i^k$ values) without incorporating the previous cycle decision. Circuit 700 may include g nodes (e.g., g nodes 702), h nodes (e.g., h nodes 704 and 714), optional buffers (e.g., buffer 706), and pipeline registers (e.g., pipeline register 712) connected as shown in FIG. 7A in accordance with items (a)-(c) shown above. It is noted that each of the g nodes 702 (where each g node may implement a multiplexer) receives $S_n$ as the select input. The inputs to each of the g nodes 702 (e.g., input 708) provide the result of speculatively combining the look-ahead symbols using h nodes. When the select input $S_n$ is provided to the g nodes 702, the g nodes 702 may generate outputs $S_{n+1}$ through $S_{n+5}$ in a single computation cycle. Thus, the critical path delay in circuit 700 may include a single g node. Delay 710 may be used to store the last output (e.g., $S_{n+5}$) so that the last output (e.g., $S_{n+5}$) can be used as the select signal in the next computation cycle.

The pipeline registers (e.g., pipeline register 712) may be bypassed depending on the operating frequency. Specifically, the operating frequency may be dynamically changed, and the pipeline stages may be bypassed dynamically to maintain constant latency through the multiplexing structure. In FIG. 7B, the pipeline register 712 may include register 720 and multiplexer 722. Select signal 724 may be used to control whether the signal received from h node 704 is saved in register 720 or bypassed to h node 714. Select signal 724 may be generated by circuitry (not shown in FIG. 7B) which controls the operating frequency. Specifically, at lower operating frequencies, select signal 724 may bypass register 720, and at higher operating frequencies, select signal 724 may save the signal received from h node 704 in register 720.

Some embodiments described herein feature a circuit which may include (1) a first circuit to generate a first set of channel state vectors corresponding to a communication channel, where each channel state vector in the first set of channel state vectors includes a set of channel state indices, and where each channel state index in the set of channel state indices corresponds to a sequence of symbols, (2) a second circuit to combine a first channel state vector and a second channel state vector in the first set of channel state vectors to obtain a combined channel state vector, and (3) a third circuit to select a first channel state index in the combined channel state vector based on a second channel state index. For example, the first circuit may include multiple instances of the circuitry in circuit 200 of FIG. 2 which generates the channel state vector $\overrightarrow{P_{n+1}}$. The second circuit may correspond to a h node, e.g., h node 312 in FIG. 3 which combines channel state vectors $\overrightarrow{P_{n+2}}$ and $\overrightarrow{P_{n+3}}$. The third circuit may correspond to a g node, e.g., g node 306 in FIG. 3 which selects channel state index $S_{n+3}$ in the combined channel state vector Q(2, 3) based on channel state index $S_{n+1}$.

In some embodiments described herein, the second circuit may include a set of multiplexers, where a multiplexer in the set of multiplexers selects a second element from the second channel state vector based on a first element of the first channel state vector. For example, in Equation (7), each function g may correspond to a multiplexer in the set of multiplexers, the second channel state vector may be $\vec{u}$, and the first channel state vector may be $\vec{t}$.

In some embodiments described herein, the third circuit may include a multiplexer, e.g., a multiplexer which is represented by the letter "g" in this disclosure.

In some embodiments described herein, the second circuit may recursively combine multiple channel state vectors in the first set of channel state vectors to obtain the combined channel state vector. For example, in FIG. 5, the set of h nodes recursively combine channel state vectors $\overrightarrow{P_{n+1}}$ through $\overrightarrow{P_{n+5}}$.

In some embodiments described herein, the second circuit may be coupled with the third circuit using a chain of one or more pipeline registers, where a pipeline register may include a multiplexer and a register, and where a select signal to the multiplexer may control whether an input to the pipeline register bypasses the register or is saved in the register. For example, in FIG. 7A, the pipeline path from vector $\overrightarrow{P_{n+1}}$ to channel state index $S_{n+2}$ includes a chain of pipeline registers which couples an h node (i.e., the circuit circuit) with a g node (i.e., the third circuit).

In some embodiments described herein, the first channel state index may be determined in a current computation cycle, and where the second channel state index may be determined in a previous computation cycle. For example, in FIG. 3, $S_{n+3}$ may be determined in a current computation cycle, and $S_{n+1}$ may be determined in a previous computation cycle.

In some embodiments described herein, the first circuit may include: (1) a fourth circuit to convolve a set of channel coefficients with a set of symbols to obtain a convolution result, (2) a fifth circuit to combine the convolution result with a signal sample to obtain a combined result, where signal sample corresponds to a signal received over the communication channel, and (3) a sixth circuit to slice the combined result to obtain a third channel state index in the first set of channel state vectors. For example, the first circuit may include multiple instances of the circuitry in circuit 200 of FIG. 2 which generates the channel state vector $\overrightarrow{P_{n+1}}$. The fourth circuit may correspond to circuits 202 and 204, the fifth circuit may correspond to circuit 206, and the sixth circuit may correspond to slicer 208.

In some embodiments described herein, the set of channel coefficients may at least partially repair a signal corruption which the communication channel introduces into the signal as the signal passes through the communication channel. For example, the coefficients c[1] through c[v] in FIG. 2A may at least partially repair a signal corruption (e.g., waveform 112) which the communication channel (e.g., communication channel 106) introduces into the signal (e.g., signal 104) as the signal passes through the communication channel.

In some embodiments described herein, the first circuit may include a seventh circuit to generate a decoded symbol based on the channel state index. Specifically, the seventh circuit may perform a modulo operation on the channel state index to generate the decoded symbol. For example, the seventh circuit may correspond to circuit 214 in FIG. 2A.

In some embodiments described herein, a critical path in the circuit may pass through the third circuit, and where a delay of the critical path may be proportional to a logarithm of a count of symbols decoded in a computation cycle. For example, in FIG. 3, the critical path may pass through g nodes 302, 306, and 310 (where the third circuit may correspond to a g node), and the delay of the critical path in FIG. 3 may be proportional to a logarithm (e.g., $\log_2 N$) of a count of symbols (N) decoded in a computation cycle.

In some embodiments described herein, the critical path in the circuit may pass through the third circuit, and where a delay of the critical path may be substantially constant regardless of a count of symbols decoded in a computation cycle. For example, in FIG. 5, the critical path may pass through a single g node (e.g., the leftmost g node in g nodes 502), and the delay of the critical path in FIG. 5 may be substantially constant (e.g., approximately equal to the delay through a single g node) regardless of the count of symbols (N) decoded in a computation cycle.

Figure 8:
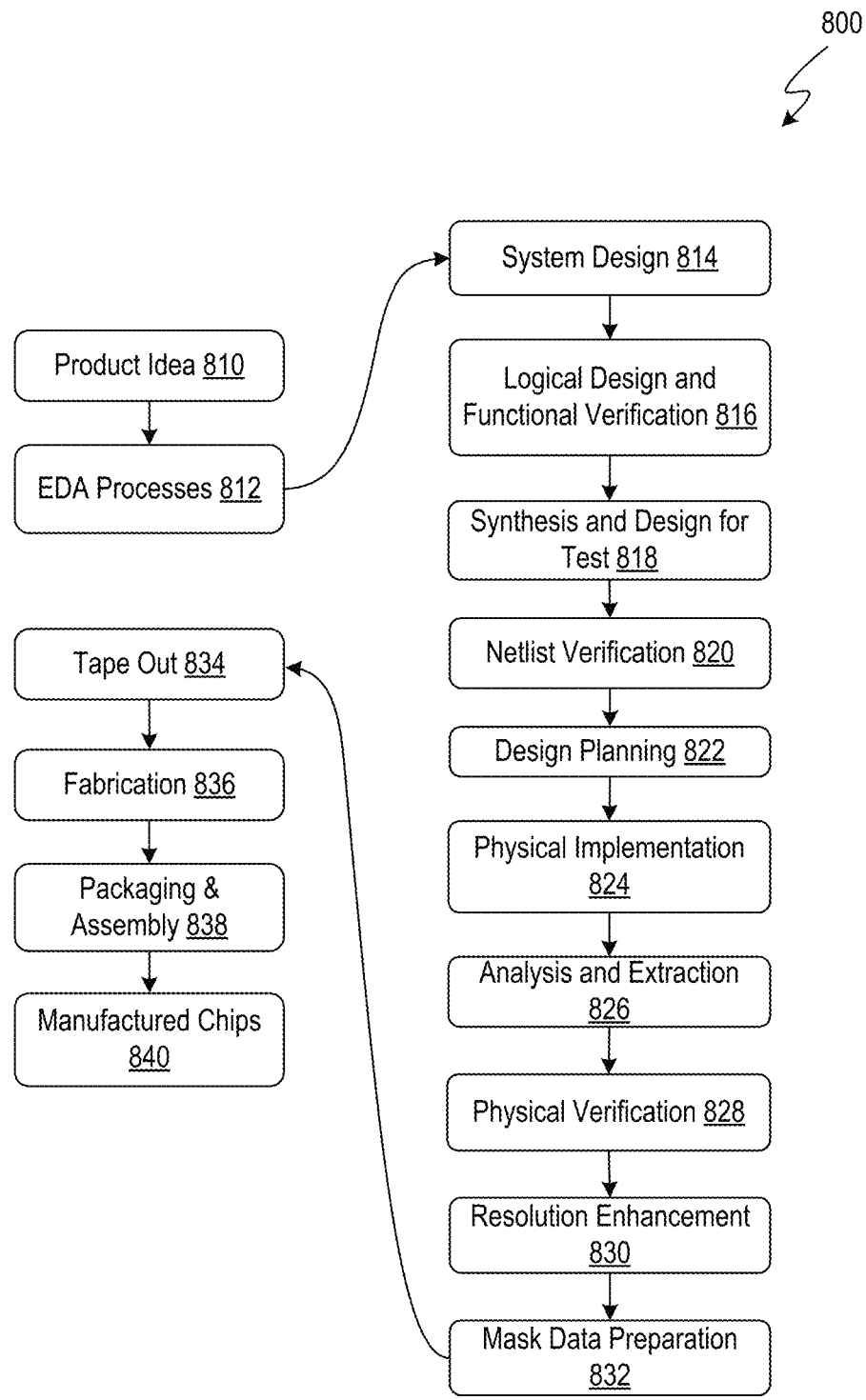
FIG. 8 illustrates an example set of processes used during the design, verification, and fabrication of an article of manufacture such as an integrated circuit to transform and verify design data and instructions that represent the integrated circuit.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 8. The processes described by may be enabled by EDA products (or EDA systems).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent how the components are interconnected and where the nodes of the graph structure represent components of a circuit. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
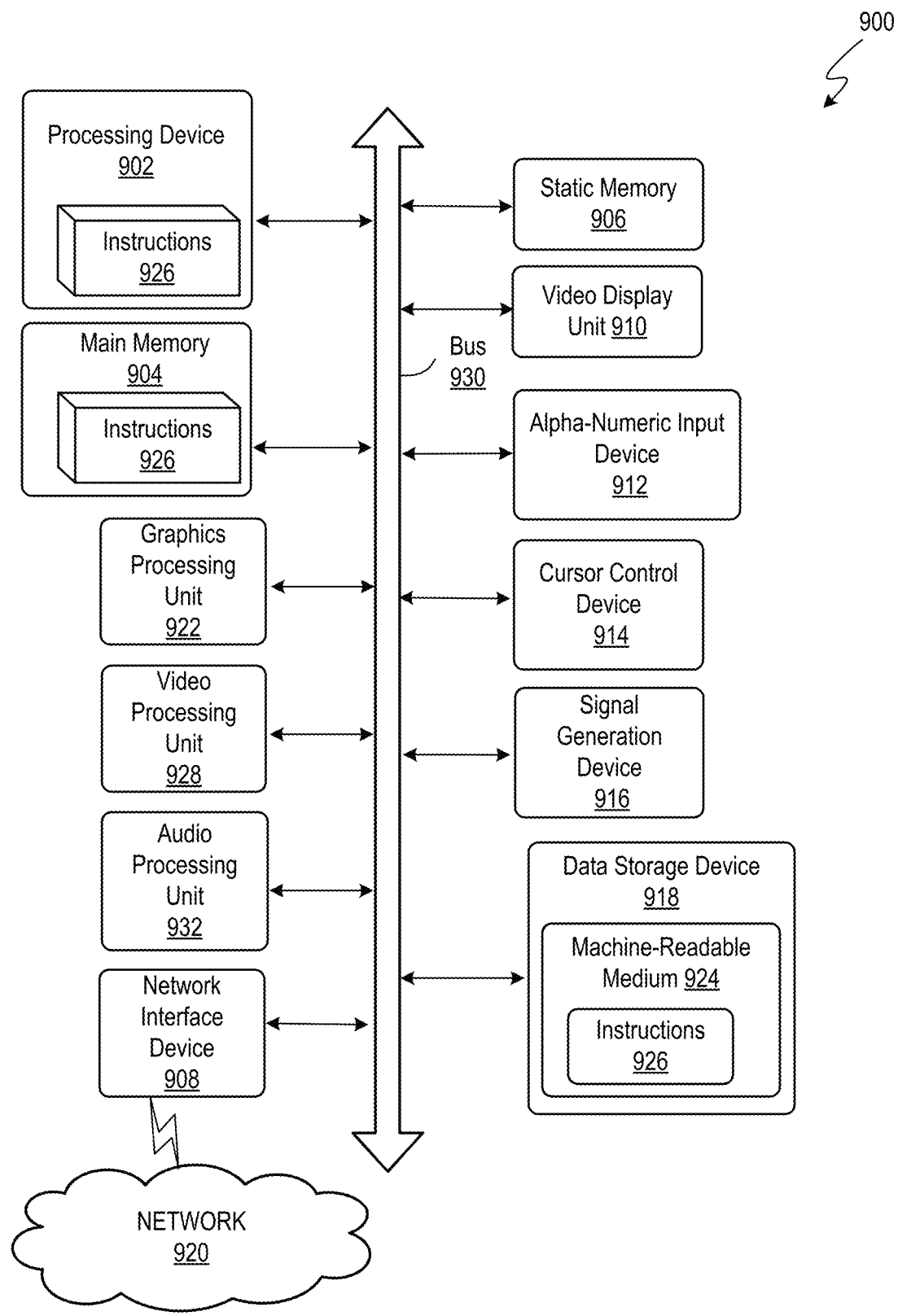
FIG. 9 illustrates an example machine of a computer system within which a set of instructions, for causing the machine to perform any one or more of the methodologies discussed herein, may be executed.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets.

Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A circuit, comprising:
    a first circuit to generate a first set of channel state vectors corresponding to a communication channel, wherein each channel state vector in the first set of channel state vectors includes a set of channel state indices, and wherein each channel state index in the set of channel state indices corresponds to a sequence of symbols;
    a second circuit to combine a first channel state vector and a second channel state vector in the first set of channel state vectors to obtain a combined channel state vector; and
    a third circuit to select a first channel state index in the combined channel state vector based on a second channel state index.

2. The circuit of claim 1, wherein the second circuit includes a set of multiplexers, wherein a multiplexer in the set of multiplexers selects a second element from the second channel state vector based on a first element of the first channel state vector.

3. The circuit of claim 1, wherein the third circuit includes a multiplexer.

4. The circuit of claim 1, wherein the second circuit recursively combines multiple channel state vectors in the first set of channel state vectors to obtain the combined channel state vector.

5. The circuit of claim 1, wherein the first channel state index is determined in a current computation cycle, and wherein the second channel state index is determined in a previous computation cycle.

6. The circuit of claim 1, wherein the first circuit comprises:
a fourth circuit to convolve a set of channel coefficients with a set of symbols to obtain a convolution result;
a fifth circuit to combine the convolution result with a signal sample to obtain a combined result, wherein signal sample corresponds to a signal received over the communication channel; and
a sixth circuit to slice the combined result to obtain a third channel state index in the first set of channel state vectors.

7. The circuit of claim 6, wherein the set of channel coefficients at least partially repairs a signal corruption which the communication channel introduces into the signal as the signal passes through the communication channel.

8. The circuit of claim 1, further comprising a fourth circuit to generate a decoded symbol based on the first channel state index.

9. The circuit of claim 8, wherein the fourth circuit performs a modulo operation on the first channel state index to generate the decoded symbol.

10. The circuit of claim 1, wherein a critical path in the circuit passes through the third circuit, and wherein a delay of the critical path is proportional to a logarithm of a count of symbols decoded in a computation cycle.

11. The circuit of claim 1, wherein a critical path in the circuit passes through the third circuit, and wherein a delay of the critical path is substantially constant regardless of a count of symbols decoded in a computation cycle.

12. The circuit of claim 1, wherein the second circuit is coupled with the third circuit using a chain of one or more pipeline registers, wherein a pipeline register includes a multiplexer and a register, and wherein a select signal to the multiplexer controls whether an input to the pipeline register bypasses the register or is saved in the register.

13. A method, comprising:
generating a first set of channel state vectors corresponding to a communication channel, wherein each channel state vector in the first set of channel state vectors includes a set of channel state indices, and wherein each channel state index in the set of channel state indices corresponds to a sequence of symbols;
combining a first channel state vector and a second channel state vector in the first set of channel state vectors to obtain a combined channel state vector; and
selecting a first channel state index in the combined channel state vector based on a second channel state index.

14. The method of claim 13, wherein the first channel state index is determined in a current computation cycle, and wherein the second channel state index is determined in a previous computation cycle.

15. The method of claim 13, wherein generating the first set of channel state vectors comprises:
convolving a set of channel coefficients with a set of symbols to obtain a convolution result;
combining the convolution result with a signal sample to obtain a combined result, wherein signal sample corresponds to a signal received over the communication channel; and
slicing the combined result to obtain a third channel state index in the first set of channel state vectors.

16. The method of claim 15, wherein the set of channel coefficients at least partially repairs a signal corruption which the communication channel introduces into the signal as the signal passes through the communication channel.

17. The method of claim 13, further comprising generating a decoded symbol based on the first channel state index.

18. The method of claim 17, wherein generating the decoded symbol comprises performing a modulo operation on the first channel state index to generate the decoded symbol.

19. A non-transitory computer-readable medium comprising stored instructions, which when executed by a processor, cause the processor to generate a digital representation of a circuit, the circuit comprising:
a first circuit to generate a first set of channel state vectors corresponding to a communication channel, wherein each channel state vector in the first set of channel state vectors includes a set of channel state indices, and wherein each channel state index in the set of channel state indices corresponds to a sequence of symbols;
a second circuit to combine a first channel state vector and a second channel state vector in the first set of channel state vectors to obtain a combined channel state vector;
a third circuit to select a first channel state index in the combined channel state vector based on a second channel state index; and
wherein a critical path in the circuit passes through the third circuit, and wherein a delay of the critical path increases at a rate which is less than or equal to a logarithm of a count of symbols decoded in a computation cycle.

20. The non-transitory computer-readable medium of claim 15, wherein the first channel state index is determined in a current computation cycle, and wherein the second channel state index is determined in a previous computation cycle.

* * * * *